Dec. 12, 1944.                D. R. STAMY ET AL                2,364,670
                            PERISCOPIC VISION DEVICE
                            Filed May 29, 1942                 2 Sheets-Sheet 1

INVENTORS
DAVID R. STAMY
CHARLES E. FISHER
BY
ATTORNEYS

Dec. 12, 1944.　　　D. R. STAMY ET AL　　　2,364,670
PERISCOPIC VISION DEVICE
Filed May 29, 1942　　　2 Sheets-Sheet 2

INVENTORS
DAVID R. STAMY
CHARLES E. FISHER
BY
*Hyde and Meyer*
ATTORNEYS

Patented Dec. 12, 1944

2,364,670

UNITED STATES PATENT OFFICE 2,364,670

PERISCOPIC VISION DEVICE

David R. Stamy, Huntington Woods, and Charles E. Fisher, Detroit, Mich., assignors to The Standard Products Company, Detroit, Mich., a corporation of Ohio Application May 29, 1942, Serial No. 444,976

7 Claims. (Cl. 88—68)

This invention relates to an improved periscopic vision device, especially useful for military purposes, and including improved housing means for protecting the optical elements thereof and for retaining said elements in accurately aligned, operative position.

As will hereinafter more fully appear, the present invention relates to an indirect vision device, namely, a device which angularly diverts rays of light from an object under observation, through one or more successive changes in direction, before said light rays reach the eye of the observer. Devices of this nature obviously are useful in armored tanks, airplanes, armored gun emplacements, or in any location where it is desirable and feasible to protect the operator from bullets, shrapnel, etc., since observers using such devices frequently have suffered severe injuries from an impact on the device, which practically inevitably results in shattering the mirrors or prismatic units of optical glass, with consequent likelihood of serious damage to the observer's eyes.

One object of the invention, therefore, is to provide an improved device of this kind embodying a housing which satisfactorily safeguards the operator from injury.

Another object is to provide novel and improved protective housing means which, when assembled with the optical elements therein contained, provides a sturdy and efficient optical unit which conveniently and quickly may be placed in operative position, or removed therefrom, said housing being formed, in large part, from sheet metal.

Another object is to provide an assembly of housing and light transmitting and reflecting means therein, in which replacement of broken parts may be quickly accomplished, even in the stress of battle.

Other objects and advantages of devices embodying the present invention will appear from the following description of one embodiment thereof, reference being had to the accompanying drawings, in which Fig. 1 is a front elevation of an optical unit housing assembly, a portion of the housing being broken away to show the prism arrangement therein.

Figure 1:
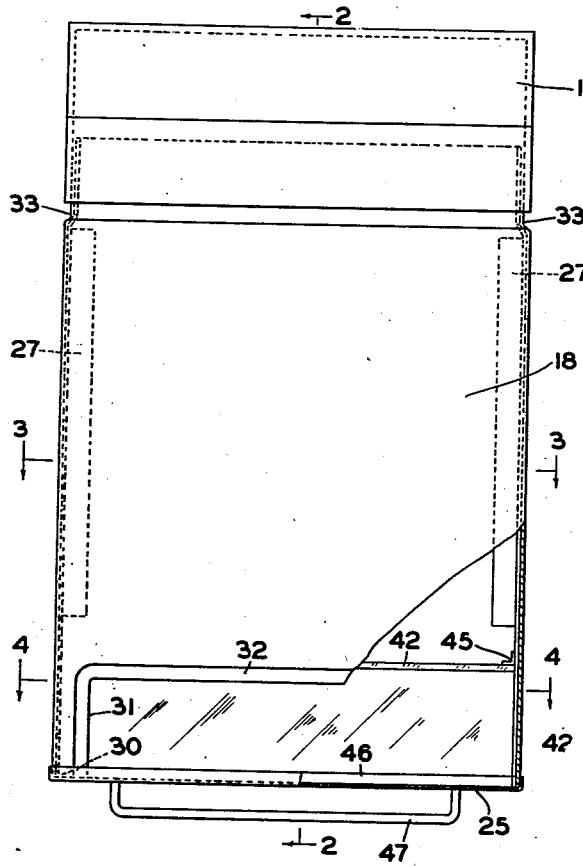

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation.

The optical means for the periscopic vision device now to be described comprises a pair of transparent, shatterproof prisms 11 and 12, respectively provided with surfaces 13 and 14 angularly disposed to light rays incident thereto in operation of the device, as will appear. Prisms 11 and 12 are preferably formed from a suitable organic plastic material of optical characteristics quite similar to glass, such material being obtainable, for example, from the group of organic plastics known as the acrylates. The acrylates have excellent light transmission properties, are thermoplastic, and are readily moldable to desired contours. A material of this nature which has been found to be quite suitable is sold commercially under the trade name "Plexiglas." It crumbles or breaks up harmlessly on severe impact, instead of splintering or shattering with sharp edges, as does glass.

Surfaces 13 and 14 support means for diverting light rays from their planes of incidence, such diversion taking place within the respective prisms 11 and 12. Such means may consist of mirrored coatings deposited directly on said surfaces, or, as shown in the present instance, separate mirror elements 15 and 16 may be held in planar contact with surfaces 13 and 14 either mechanically or by some suitable transparent adhesive between the contacting faces of each mirror element and its prism. As will be understood by those familiar with the optical arts, a pair of such prisms placed in properly aligned cooperating relationship in an optical device transmits light rays therethrough and causes them to emerge, each along a line which is out of registry with its line of incidence, thereby achieving what will be hereinafter termed indirect or periscopic vision.

The housing of the device now to be described not only shields the observer from flying fragments, but also protects the paired optical units and retains them in operative alignment. It comprises a box-like body portion referred to generally by reference numeral 17, open at the front and top, a front cover plate 18, and a top cap 19. In the embodiment shown in Figs. 1 to 7, the body consists of a rear wall 20, two side walls 21, and an inclined bottom wall 23, suitably arranged to receive and support the remaining front wall and cover. In the form shown in Fig. 2, the wall 23 has a front horizontal portion 24 and an upturned flange 25 which serve to receive and retain the bottom edge of the front wall 18.

Figure 3:
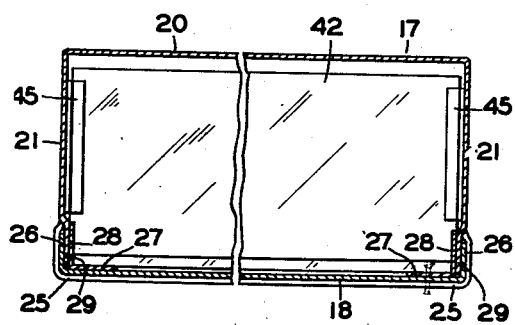
Fig. 3 is a sectional plan view taken on the line 3—3 of Fig. 1.
Figure 4:
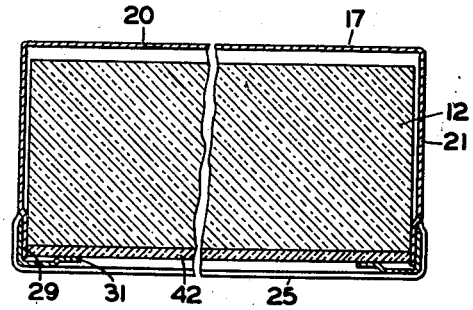
Fig. 4 is a similar section, taken on the line 4—4 of Fig. 1.
Figure 5:
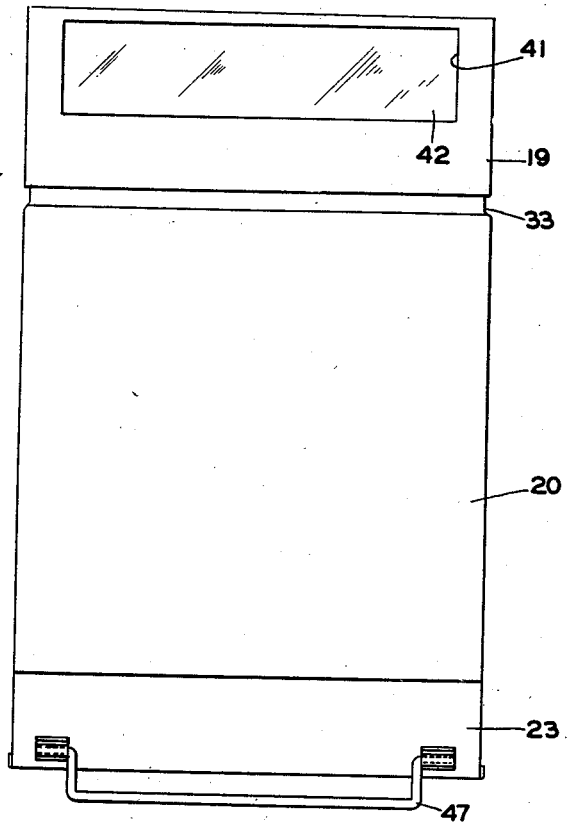
Fig. 5 is a rear elevation of the device shown in Fig. 1.
Figure 6:
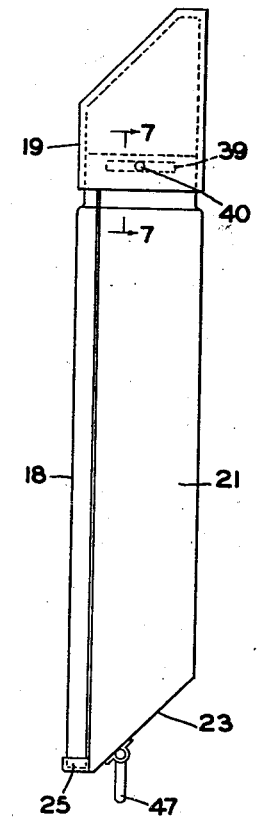
Fig. 6 is a side elevation as seen from the right of Fig. 1.

As best seen in Fig. 3, the front cover plate 18 is provided with rearwardly extending vertical edge flanges 26. An angle strip or bracket 27 is attached to the inner face of said cover plate slightly spaced from, and parallel to, each edge flange 26, and having a rearwardly extending flange 28 parallel to each said edge flange 26. There is thereby provided, between each pair of flanges 26 and 28 along the vertical edges of said front plate, a channel-like groove adapted to receive the front edges 29 of the side walls 21 of the body member, in which position they are frictionally but removably held or retained by the group of the resilient flanges 26, 28. In assembling the front plate 18 on the body 20 the plate is urged rearwardly and downwardly until edges 29 are fully inserted between flanges 26 and 28 and until the lower corner portions 30 of wall 18 are retained within and behind flange 25.

The lower front portion of cover plate 18 is cut away to present horizontally a substantially rectangular window or opening 31 (Fig. 2), the wall portion framing and defining said opening being inset, at 32. As will subsequently appear, opening 31 is one of a pair of cooperating apertures in the housing assembly which permits and controls passage of the visual rays in the periscopic functioning of the device.

The box-like container formed by the described assembly of body 17 and front cover plate 18 is provided at its upper end, with a peripheral inset 33, thereby slightly reducing its cross-sectional dimensions. This reduction permits the application of a cap 19 to such inset wall portions in such manner that when the cap is in place the outer surfaces of the vertical walls of said cap are flush with the outer surfaces of cover plate 18, side walls 21, and rear wall 20. Cap 19 houses the upper prism 11 and also helps to retain the front cover plate 18 in assembled relationship with the body 17. It also may be made of sheet metal but, as shown, is molded or shaped from synthetic plastic material similar to that employed for the prisms 11, 12, although this is not essential.

Figure 7:
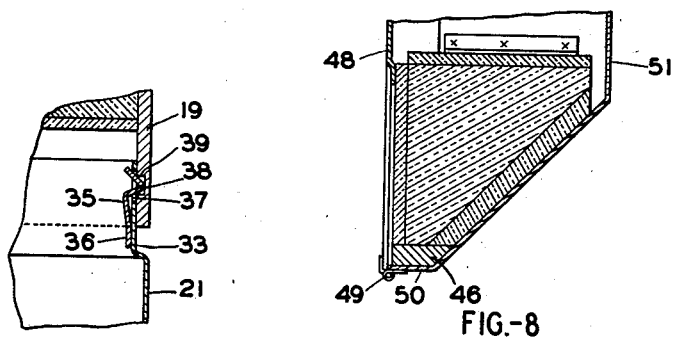
Fig. 7 is a section taken on the line 7—7 of Fig. 6.

A suitable latch may be provided to releasably retain the cap 19 in its operative position. As best shown in Figs. 1 and 7 a leaf spring 35 is suitably secured, as by rivets or welding, at 36, to the inner surface of the inset portion 33 of each side wall 21. Said inset portion is provided with a slot 37, and the leaf spring has an outwardly projecting portion 38 which the spring itself biases normally to protrude through slot 37 to seat in a groove 39 on the inner wall of cap 19, said slot 37 and groove 39 being in mutual registry when the cap is in operative position. Said outwardly projecting portion 38 is of tapered contour, so as to permit the cap 19 to be pushed downwardly beyond the spring to a final position wherein the spring latch snaps into position. The cap wall forming the bottom of groove 39 may be provided with a small perforation 40 through which the leaf spring 35 may be engaged to push it in and thereby facilitate removal of the cap.

Figure 2:
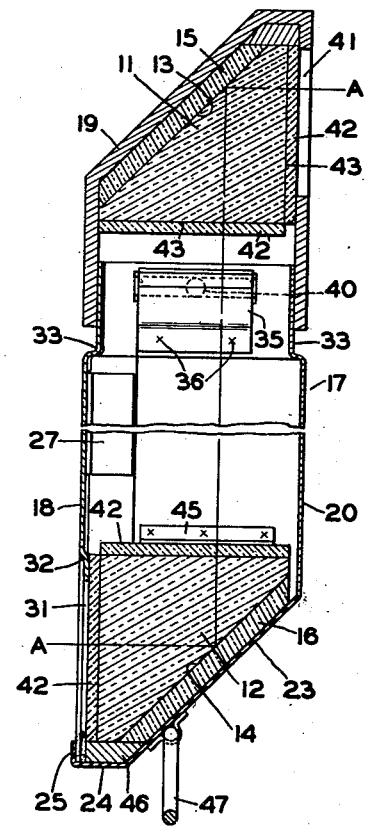
Fig. 2 is a vertical section taken on the line 2—2 of Fig. 1, the view being somewhat enlarged, and the central portion being omitted.

Cap 19 is provided on its upper rear face with a rectangular aperture 41 substantially similar to the aperture 31 in the lower front cover plate. As heretofore indicated, and as best seen in Fig. 2, the purpose of said apertures is to permit visual rays entering one aperture to be diverted from their lines of incidence by means of prisms 11 and 12, or by mirrors 15 and 16, so that said rays leave by the other said aperture. The path of one such ray is indicated by the broken line A—A in Fig. 2, the actual reflecting surfaces in this instance being carried by the separate mirrors 15 and 16. As will be understood by those skilled in the optical arts, an internal reflection, such as results in the deviation of the line A—A within each prism, may be produced by a prism face alone, or may be assisted by a reflecting coating applied to said face, or by a mirror element carried thereby. In the present instance each of the mirror elements 15 and 16 carries a reflecting surface which is held in contact with its prism, the mirror and the prism being adhesively united by a suitable grade of transparent adhesive of optical characteristics similar to those of the prism material.

Facing strips 42 of optical glass may be applied to the vertical light transmitting surfaces 43 of both prisms. These are desirable because the organic plastic prism material is usually relatively softer than optical glass, and in cleaning the prism surfaces accidental inclusions of abrasive particles might scratch the light transmitting surfaces and reduce their optical accuracy and efficiency. The use of the relatively scratch-proof facing strips 42 is therefore advocated to protect the prism faces. The facing strips perform no function in light diversion since the light rays pass through said strips at an angle substantially normal thereto. The facing strips may be adhesively attached to the prisms in manner similar to the attachment of mirrors 15 and 16, as hereinabove described.

Prisms 11 and 12 are fastened or mounted within the housing in any suitable manner. It may be desirable that they be readily removable for replacement, in case of injury. Prism 12 is shown thus removable in Fig. 2, while prism 11 may be adhesively retained in cap 19. Replacement caps, each carrying a prism 11, may be carried for substitution in case prism 11 is damaged, because this prism is the one looking forwardly and exposed to direct impact. Upon removal of cap 19, the front cover plate 18 is drawn upwards until its lower edge clears flange 25, after which it is removed by lifting it outwardly away from the body portion. Prism 12 is shown in Figs. 1 and 2 as being restrained from upward dislodgement by an angle form abutment bracket 45 which slidably bears against the upper surface of the glass facing strip. A filler strip 46 of any suitable material may be used to support prism 12 at such a height that when the prism is withdrawn outwardly after removal of the front cover plate, its bottom surface clears the top of flange 25.

For convenience in handling the housed optical unit just described, a handle member 47 may be hinged at some easily accessible surface portion on the body 17, for example on the bottom sloping surface 23. The housing assembly, when ready for use, is slid upwardly into a fitted receptacle in an armored wall (not shown) or similar location, until its upper viewing aperture 41 reaches registry with an aperture in the armor. It is there preferably removably held in place by suitable clamps or other convenient means. For removal in case of damage to the unit, or for cleaning, the clamping means is released and the handle 47 is used to withdraw the unit from operating position.

Figure 8:
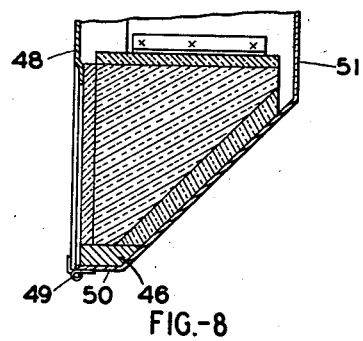
Fig. 8 is a fragmentary section generally similar to the lower portion of Fig. 2, but showing a modified form of retaining means for the lower edge of the front cover plate.

Fig. 8 shows modified means for assembling the housing parts around the optical units. In this form the lower edge of the front cover plate 48 is pivotally attached, by means of a hinge 49, to the bottom horizontal portion 50 of the body member 51. This renders the interior of the housing somewhat more readily accessible, the cover plate merely swinging outwardly in book cover fashion after the top cap is removed.

In the manufacture of these devices in quantity the parts of the housing are first fabricated in proper shape and form. In the arrangement shown in Fig. 1 these housing parts include the body member 17 with its back, side and bottom walls, to the latter of which is attached the handle 47, the front wall 18, and the removable telescoping cap 19.

The prism elements, upper and lower, are preferably duplicates and interchangeable. They are fabricated separately, each consisting of a block or mass of synthetic plastic material having its surfaces accurately ground with the proper angular relation and with the cover or protecting glass plates 42 and mirror elements 15, 16 fastened to the surfaces of said block. One of these prism elements is inserted into its position in the bottom of the housing, and the cover is applied to the housing, either by inserting its lower edge behind the flange 25, in Fig. 2, or by swinging it upwardly about the hinge axis, in Fig. 8. Another of the prism elements is then inserted into place in the cover, either removably or more or less permanently, as desired. The cover is then applied to the body of the receptacle until releasably latched by the latch 35, when the device is ready for use.

The complete device is pushed up into its recess or seat in the armor, where it is releasably held with its forwardly looking upper viewing window opposite the opening in the armor. Upon impact of a bullet or fragment with the forwardly looking prism (the upper one), such as to shatter or injure any of the parts, the entire device can be pulled out by means of the handle 47, to be replaced by another complete device serving as a substitute. However, either at the time, or later when more time is available, the cap can be removed and the prism element therein replaced, or another cap with a like prism element may be substituted for the original, restoring the entire device to useful condition ready at any time.

The device as a whole is of simple form and may be made at relatively low cost. Its glass and plastic parts are entirely housed within a sheet metal casing, which may be made strong enough to prevent escape of flying fragments such as might injure the operator.

Further advantages of the invention will be apparent to those skilled in the art.

What we claim is:

1. A periscopic viewing device, comprising a pair of internally reflecting prisms, and a container for enclosing said prisms, said container having a body portion closed at one end and having a removable closure for its other end, one of said prisms being mounted in said body portion at its closed end and the other of said prisms being mounted in said closure, said body portion and said closure having viewing apertures in optical registry with said prisms, said closure and said body portion having telescopingly lapped edge portions when said closure is in operative position, the lapped edge of said body portion having an aperture therethrough, the complementary lapped edge of said closure having on its internal face a recess in registry with said aperture and snap catch means carried by said body portion and having a projecting portion extending through said aperture and seating in said recess when the closure is in said operative position.

2. A periscopic viewing device, comprising a pair of internally reflecting prisms, and a container for enclosing said prisms, said container having a body portion closed at one end and having a readily removable closure for its other end, one of said prisms being mounted in said body portion at its closed end and the other of said prisms being mounted in said closure, said body portion and said closure having viewing apertures in optical registry with said prisms, said closure having a recessed portion on its internal surface, spring-impelled catch means carried by said body portion and seatable in said recess for releasably retaining said closure on said body portion, the wall of said closure having an aperture therethrough in the vicinity of said recess to permit insertion therethrough of catch unseating means to facilitate removal of said closure.

3. A periscopic viewing device, comprising a pair of internally reflecting prisms in spaced periscopic relationship, housing means therefor consisting of a sheet metal body member, a sheet metal front cover plate, and a plastic cap, said body member having a rear wall, two forwardly directed side walls, and a bottom wall, means carried by the forward edge of said bottom wall for retaining the lower edge of said cover plate, means carried by the vertical edges of said cover plate and comprising a pair of spaced, parallel, rearwardly directed flanges for releasably gripping the front edges of the side walls, said plastic cap being disposed upon the upper edges of said body member and said cover plate in telescoped relationship, and means for retaining a pair of optically cooperating, internally reflecting prisms within said housing.

4. A periscopic viewing device comprising a pair of internally reflecting prisms in spaced periscopic relationship, housing means therefor consisting of a sheet metal body member, a sheet metal front cover plate, and a plastic cap, said body member having a rear wall, two forwardly directed side walls, and a bottom wall, means carried by the forward edge of said bottom wall for retaining the lower edge of said cover plate, means carried by the vertical edges of said cover plate for releasably gripping the front edges of the side walls, said plastic cap being disposed upon the upper edges of said body member and said cover plate in telescoped relationship, and means for retaining a pair of optically cooperating internally reflecting prisms within said housing.

5. A periscopic viewing device, comprising a pair of internally reflecting prisms in spaced periscopic relationship, housing means therefor, consisting of a sheet metal body member, a sheet metal front cover plate, and a plastic cap, said body member having a rear wall, two forwardly directed side walls, and a bottom wall, means carried by the forward edge of said bottom wall for retaining the lower edge of said cover plate, means carried by the vertical edges of said cover plate for releasably gripping the front edges of the side walls, said plastic cap being disposed upon the upper edges of said body member and said cover plate in telescoped relationship, the lower front portion of said cover plate having a light transmitting aperture therein, and the upper rear portion of the cap having a like aperture, a pair of optically opposed, cooperating, internally reflecting prisms disposed one of each opposite each said aperture and within said housing, whereby visual rays entering through one said aperture are diverted successively through and by means of both said prisms so as to be emitted through the other said aperture.

6. A periscopic viewing device, comprising a pair of internally reflecting prisms, and a container for enclosing said prisms, said container having a body portion closed at one end and having a readily removable closure for its other end, one of said prisms being mounted in said container body portion at its closed end and the other of said prisms being mounted in said container closure, said container body portion having forwardly extending side walls, and a front wall movable relatively thereto, a pair of parallel projections near each vertical edge of said front wall, each such pair of projections defining therebetween a rearwardly open channel for receiving an adjacent front edge of one of said side walls in frictional sliding relationship, said front wall and said closure being provided with viewing apertures, said viewing apertures being located in respective optical registry with said prisms.

7. A periscopic viewing device comprising a pair of internally reflecting prisms, and a container for enclosing said prisms, said container having a hollow body portion closed at one end and open at the other end, and a cap telescopingly mounted on said open end, said body portion having a front wall movably hinged thereon near said closed end, said front wall being normally retained in closed position by said cap, one of said prisms being mounted in said body portion near said closed end, and the other of said prisms being mounted in said cap, said hinged front wall and said cap being each provided with a viewing aperture in respective optical registry with said prisms.

DAVID R. STAMY.
CHARLES E. FISHER.